United States Patent
Lee

(10) Patent No.: US 11,770,543 B2
(45) Date of Patent: *Sep. 26, 2023

(54) METHOD AND DEVICE FOR DECODING VIDEO

(71) Applicant: ATINS INC., Seongnam-si (KR)

(72) Inventor: Sun Young Lee, Seongnam-si (KR)

(73) Assignee: ATINS INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/643,370

(22) Filed: Dec. 8, 2021

(65) Prior Publication Data
US 2022/0103841 A1    Mar. 31, 2022

Related U.S. Application Data

(63) Continuation of application No. 17/314,032, filed on May 6, 2021, now Pat. No. 11,265,560, which is a
(Continued)

(30) Foreign Application Priority Data

Apr. 24, 2020  (KR) .................. 10-2020-0050298
Nov. 17, 2020  (KR) .................. 10-2020-0153465
Nov. 17, 2020  (KR) .................. 10-2020-0153467

(51) Int. Cl.
*H04N 19/169*   (2014.01)
*H04N 19/82*    (2014.01)

(52) U.S. Cl.
CPC ........... *H04N 19/188* (2014.11); *H04N 19/82* (2014.11)

(58) Field of Classification Search
CPC .... H04N 19/174; H04N 19/188; H04N 19/42; H04N 19/70; H04N 19/82; G06T 9/004; G06T 9/008
See application file for complete search history.

(56) References Cited

U.S. PATENT DOCUMENTS

2019/0052910 A1    2/2019  Deshpande
2021/0176500 A1*   6/2021  Wu ..................... H04N 19/184

FOREIGN PATENT DOCUMENTS

| KR | 10-2015-0081236 | 7/2015 |
| KR | 10-1790156 B1   | 11/2017 |
| KR | 10-2018-0097106 | 8/2018 |

OTHER PUBLICATIONS

Wang (AHG9: A summary of proposals on mixed NAL unit types within a coded picture, Joint Video Experts Team (JVET) of ITU-T SG 16 WP 3 and ISO/IEC JTC 1/SC 29/WG 11, 18th Meeting: by teleconference, Apr. 15-24, 2020) (Year: 2020).*

(Continued)

*Primary Examiner* — Maria E Vazquez Colon
(74) *Attorney, Agent, or Firm* — BROADVIEW IP LAW, PC

(57) ABSTRACT

The present invention discloses a video decoding method performed by a video decoding device. The video decoding method according to an embodiment may include the steps of: obtaining NAL unit type information indicating a type of a current network abstraction layer (NAL) unit from a bitstream; and decoding, when the NAL unit type information indicates that the NAL unit type of the current NAL unit is an encoded data for an slice, the slice based on whether a mixed NAL unit type is applied to a current picture.

7 Claims, 20 Drawing Sheets

Related U.S. Application Data continuation of application No. PCT/KR2020/018464, filed on Dec. 16, 2020.

(56) References Cited

OTHER PUBLICATIONS

Taiwan Intellectual Property Office Application No. 110114422, Office action dated Dec. 30, 2021.
Ping Wu, AHG9: On mixed NAL unit types in a video picture, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-8, Dec. 23, 2019.
Hendry, AHG9: A summary of HLS contributions on mixed NAL unit types within a coded picture, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-6, Jan. 20, 2020.
Examination Report for IN202217042916 from Intellectual Property India dated Feb. 9, 2023.
Office Action for JP2021-560581 from Japan Patent Office dated Dec. 20, 2022.
Wang, Ye-Kui. "AHG2: Editorial input of integrated text for HLS adoptions." JVET-R0481-v1. Joint Video Experts Team (JVET) of ITU-T SG 16 WP3 and ISO/IEC JTC 1/SC 29/WG 11. 18th Meeting: by teleconference, Apr. 15-24, 2020.
Benjamin Bross et al., Versatile Video Coding (Draft 8), Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-480, Mar. 12, 2020.
Ye-Kui Wang, AHG9: A summary of proposals on mixed NAL unit types within a coded picture, Joint Video Experts Team (JVET), of ITU-T SG 16 WP 3 and ISO/IEC JTC 1/SC 29/WG 11, 18th Meeting: by teleconference, Apr. 15-24, 2020, pp. 1-9, Apr. 12, 2020.
Lulin Chen et al., AHG9: On signalling the mixed NAL unit type flag, Joint Video Experts Team (JVET) of ITU-T SG 16 WP 3 and ISO/IEC JTC 1/SC 29/WG 11, 18th Meeting: by teleconference, Apr. 15-24, 2020, pp. 1-5, Apr. 3, 2020.
Office Action for RU 2022120184/07 by Federal Service for Intellectual Property dated Jun. 2, 2023.

\* cited by examiner

FIG.10

| slice_segment_header( ) { | Descriptor |
|---|---|
| if( nal_unit_type != IDR_W_RADL && nal_unit_type != IDR_N_LP ) { | |
| short_term_ref_pic_set_sps_flag | u(1) |
| if( !short_term_ref_pic_set_sps_flag ) | |
| st_ref_pic_set( num_short_term_ref_pic_sets ) | |
| else if( num_short_term_ref_pic_sets > 1 ) | |
| short_term_ref_pic_set_idx | u(v) |
| if( long_term_ref_pics_present_flag ) { | |
| if( num_long_term_ref_pics_sps > 0 ) | |
| num_long_term_sps | u(v) |
| num_long_term_pics | u(v) |
| for( i = 0; i < num_long_term_sps + num_long_term_pics; i++ ) { | |
| if( i < num_long_term_sps ) { | |
| if( num_long_term_ref_pics_sps > 1 ) | |
| lt_idx_sps[ i ] | u(v) |
| } else { | |
| poc_lsb_lt[ i ] | u(v) |
| used_by_curr_pic_lt_flag[ i ] | u(1) |
| } | |

FIG.14

| pic_parameter_set_rbsp( ) { | Descriptor |
|---|---|
| ... | ... |
|     pps_output_flag_present_flag | u(1) |
|     pps_no_pic_partition_flag | u(1) |
|     pps_subpic_id_mapping_present_flag | u(1) |
|     if( pps_subpic_id_mapping_present_flag ) { | |
|         if( !pps_no_pic_partition_flag ) | |
|             pps_num_subpics_minus1 | ue(v) |
|         pps_subpic_id_len_minus1 | ue(v) |
|         for( i = 0; i <= pps_num_subpics_minus1; i++ ) | |
|             pps_subpic_id[ i ] | u(v) |
|     } | |
| ... | ... |
|     if( !pps_no_pic_partition_flag ) { | |
|         pps_rpl_info_in_ph_flag | u(1) |
|         pps_sao_info_in_ph_flag | u(1) |
|         pps_alf_info_in_ph_flag | u(1) |
|         if( ( pps_weighted_pred_flag \|\| pps_weighted_bipred_flag ) && pps_rpl_info_in_ph_flag ) | |
|             pps_wp_info_in_ph_flag | u(1) |
|         pps_qp_delta_info_in_ph_flag | u(1) |
|     } | |
| ... | |

FIG.15

| slice_header( ) { | Descriptor |
|---|---|
| ... | ... |
| if( !pps_rpl_info_in_ph_flag && ( ( nal_unit_type != IDR_W_RADL && nal_unit_type != IDR_N_LP ) \|\| sps_idr_rpl_present_flag ) ) | |
|     ref_pic_lists( ) | |
| ... | ... |

FIG.16

| picture_header_structure( ) { | Descriptor |
|---|---|
| ... | ... |
| if( pps_rpl_info_in_ph_flag ) | |
|     ref_pic_lists( ) | |
| ... | ... |

FIG.17

| ref_pic_lists( ) { | Descriptor |
|---|---|
|   for( i = 0; i < 2; i++ ) { | |
|     if( sps_num_ref_pic_lists[ i ] > 0 &&<br>       ( i == 0 \|\| ( i == 1 && pps_rpl1_idx_present_flag ) ) ) | |
|       rpl_sps_flag[ i ] | u(1) |
|     if( rpl_sps_flag[ i ] ) { | |
|       if( sps_num_ref_pic_lists[ i ] > 1 &&<br>        ( i == 0 \|\| ( i == 1 && pps_rpl1_idx_present_flag ) ) ) | |
|       rpl_idx[ i ] | u(v) |
|     } else | |
|       ref_pic_list_struct( i, sps_num_ref_pic_lists[ i ] ) | |
|     for( j = 0; j < NumLtrpEntries[ i ][ RplsIdx[ i ] ]; j++ ) { | |
|       if( ltrp_in_header_flag[ i ][ RplsIdx[ i ] ] ) | |
|       poc_lsb_lt[ i ][ j ] | u(v) |
|       delta_poc_msb_cycle_present_flag[ i ][ j ] | u(1) |
|       if( delta_poc_msb_cycle_present_flag[ i ][ j ] ) | |
|         delta_poc_msb_cycle_lt[ i ][ j ] | ue(v) |
|     } | |
|   } | |
| } | |

METHOD AND DEVICE FOR DECODING VIDEO

CROSS-REFERENCE TO RELATED APPLICATION(S)

This application is a continuation of U.S. application Ser. No. 17/314,032, filed on May 6, 2021, which is a continuation of International Application No. PCT/KR2020/018464, filed on Dec. 16, 2020, which claims the benefit of priority from Korean Application No. 10-2020-0050298 filed on Apr. 24, 2020, Korean Application No. 10-2020-0153465 filed on Nov. 17, 2020, and Korean Application No. 10-2020-0153467 filed on Nov. 17, 2020, the disclosure of which is incorporated by reference herein in its entirety.

TECHNICAL FIELD

The present invention relates to a subpicture split method for synthesis with other sequences and a slice split method for bitstream packing.

BACKGROUND ART

User demand on high-resolution, high-quality video are increasing. As encoded data of a high-resolution video has a larger amount of information than encoded data of a low-resolution or medium-resolution video, cost for transmitting or storing the data increases.

In order to solve such a problem, researches on encoding and decoding methods for effectively reducing the amount of encoded data of high-resolution video is continued.

DISCLOSURE OF INVENTION

Technical Problem

Therefore, the present invention has been made in view of the above problems, and it is an object of the present invention to provide a subpicture split method for synthesis with other sequences and a slice split method for bitstream packing.

Technical Solution

To accomplish the above object, according to one aspect of the present invention, there is provided a video decoding method performed by a video decoding device, the method comprising the steps of: obtaining NAL unit type information indicating a type of a current network abstraction layer (NAL) unit from a bitstream; and decoding, when the NAL unit type information indicates that the NAL unit type of the current NAL unit is an encoded data for an slice of a picture, the slice based on whether a mixed NAL unit type is applied to a current picture. Here, the step of decoding the slice may be performed by determining whether the NAL unit type of the current NAL unit indicates an attribute of a subpicture for the current slice, based on whether the mixed NAL unit type is applied.

A video decoding device according to an embodiment of the present invention for solving the problems described above is a video decoding device comprising a memory and at least one processor, and the at least one processor may obtain NAL unit type information indicating a type of a current network abstraction layer (NAL) unit from a bitstream; and decode, when the NAL unit type information indicates that the NAL unit type of the current NAL unit is an encoded data for an slice, the slice based on whether a mixed NAL unit type is applied to a current picture. At this point, decoding of the slice may be performed by determining whether the NAL unit type of the current NAL unit indicates an attribute of a subpicture for the current slice, based on whether the mixed NAL unit type is applied.

In addition, a video encoding method performed by a video encoding device according to an embodiment of the present invention for solving the problems described above may comprise the steps of: determining, when a current picture is encoded based on a mixed NAL unit type, a type of subpicture for splitting the picture; and generating a current NAL unit by encoding at least one current slice constituting the subpicture based on the type of the subpicture. Here, the step of encoding at least one current slice may be performed by encoding, when the current picture is encoded based on the mixed NAL unit type, an slice so that the NAL unit type of the current NAL unit indicates an attribute of the subpicture for the current slice.

In addition, a transmission method according to an embodiment of the present invention for solving the above problems may transmit a bitstream generated by the video encoding device or the video encoding method of the present disclosure.

In addition, a computer-readable recording medium according to an embodiment of the present invention for solving the above problems may store bitstreams generated by the video encoding method or the video encoding device of the present disclosure.

Advantageous Effects

The present invention proposes a method of generating a picture through synthesis with several other sequences. A picture in a sequence is split into a plurality of subpictures, and a new picture is generated by synthesizing split subpictures of other pictures.

According to application of the present invention, network abstraction layer (NAL) unit type values for two or more subpictures constituting a picture may be different from each other. This has an advantage of easily constituting/synthesizing a video since it does not need to equally set the NUTs of a plurality of subpictures constituting one sheet of video when synthesizing different contents.

BRIEF DESCRIPTION OF THE DRAWINGS

FIG. 10 is a view showing syntax for a slice segment header.

FIG. 14 is a view showing an embodiment of syntax of a picture parameter set (PPS).

FIG. 15 is a view showing an embodiment of syntax of a slice header.

FIG. 16 is a view showing syntax of a picture header structure.

FIG. 17 is a view showing syntax for obtaining a reference picture list.

BEST MODE FOR CARRYING OUT THE INVENTION

Figure 1:
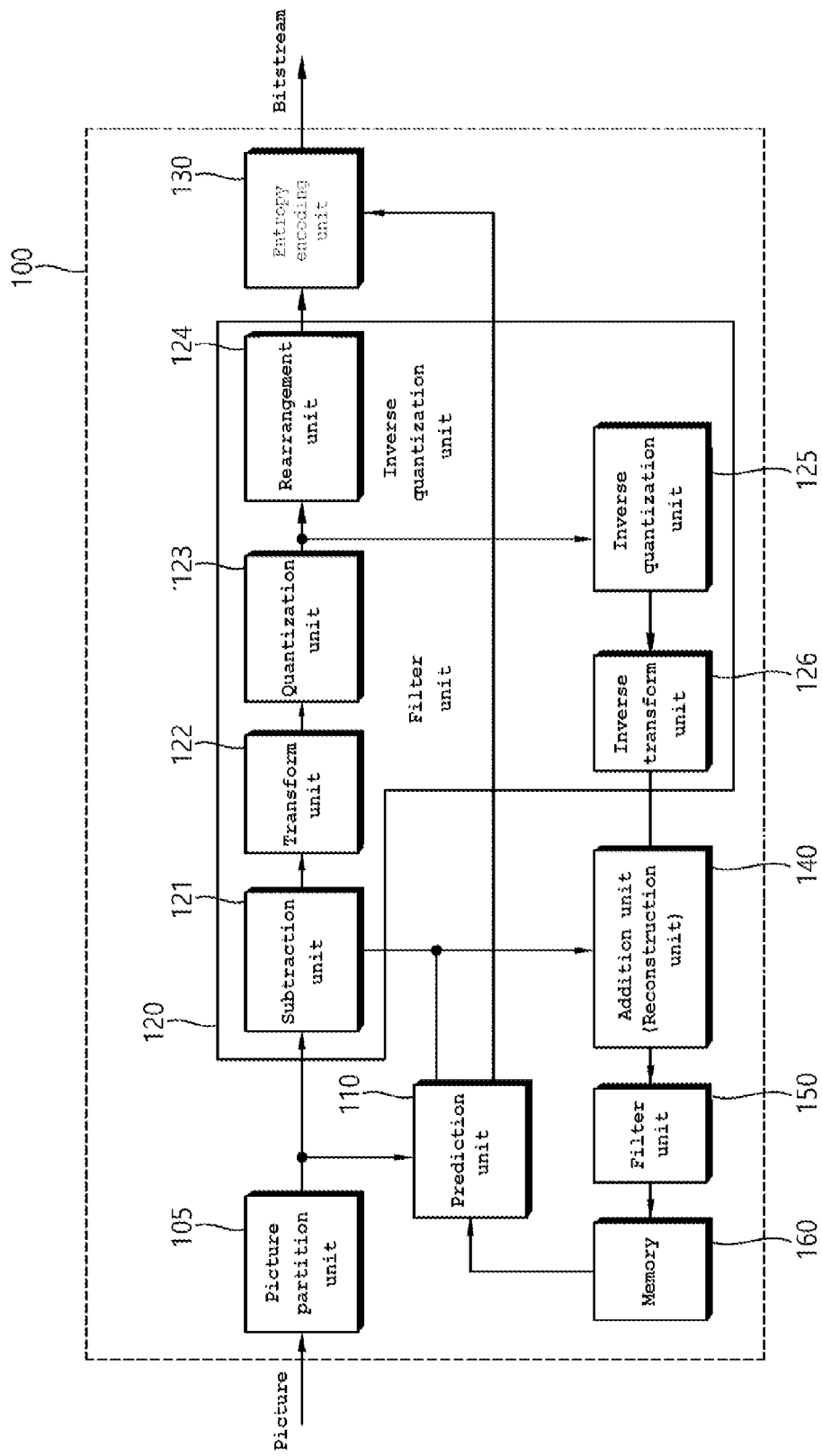
FIG. 1 is a view schematically showing the configuration of a video encoding device to which the present invention may be applied.

Since the present invention may make various modifications and provide various embodiments, specific embodiments will be illustrated in the drawings and described in detail. However, this is not intended to limit the present invention to the specific embodiments. The terms used in this specification are used only to describe the specific embodiments and not intended to limit the technical spirit of the present invention. Singular expressions include plural expressions unless the context clearly indicates otherwise. It should be understood that in this specification, terms such as "include", "have" and the like are intended to indicate existence of features, numbers, steps, operations, components, parts, or combinations thereof described in the specification, and the possibility of existence or addition of one or more other features, numbers, steps, operations, components, parts or combinations thereof are not excluded in advance.

Meanwhile, each of the components in the drawings described in the present invention is independently illustrated for convenience of description on different characteristic functions and does not mean that each of the components is implemented as separate hardware or software. For example, two or more components may be combined to form one component, or one component may be divided into a plurality of components. Embodiments in which each component is integrated and/or separated are also included in the scope of the present invention as far as it does not depart from the essence of the present invention.

Hereinafter, preferred embodiments of the present invention will be described in more detail with reference to the accompanying drawings. Hereinafter, the same reference numerals are used for the same components in the drawings, and duplicate descriptions for the same components are omitted.

Meanwhile, the present invention relates to video coding. For example, the methods/embodiments disclosed in the present invention may be applied to the methods disclosed in the versatile video coding (VVC) standard, the Essential Video Coding (EVC) standard, the AOMedia Video 1 (AV1) standard, the 2nd generation of audio video coding (AVS2) standard, or a next-generation video coding standard (e.g., H.267, H.268, etc.).

In this specification, an access unit (AU) means a unit representing a plurality of picture sets belonging to different layers output from a decoded picture buffer (DPB) at the same time. A picture generally means a unit representing a video in a specific time period, and a slice is a unit constituting a part of a picture in coding. One picture may be configured of a plurality of slices, and if needed, the picture and the slice may be interchangeably used.

A pixel or a pel may mean a minimum unit constituting one picture (or video). In addition, 'sample' may be used as a term corresponding to the pixel. Generally, a sample may represent a pixel or a pixel value and may represent only a pixel/pixel value of a luma component or may represent only a pixel/pixel value of a chroma component.

A unit represents a basic unit of video processing. The unit may include at least one among a specific area of a picture and information related to a corresponding area. The unit and the terms such as a block or an area may be interchangeably used depending on circumstances. Generally, an M×N block may represent a set of samples or transform coefficients configured of M columns and N rows.

FIG. 1 is a view schematically showing the configuration of a video encoding device to which the present invention may be applied.

Referring to FIG. 1, a video encoding device 100 may include a picture partition unit 105, a prediction unit 110, a residual processing unit 120, an entropy encoding unit 130, an addition unit 140, a filter unit 150, and a memory 160. The residual processing unit 120 may include a subtraction unit 121, a transform unit 122, a quantization unit 123, a rearrangement unit 124, an inverse quantization unit 125, and an inverse transform unit 126.

The picture partition unit 105 may split an input picture into at least one processing unit.

For example, a processing unit may be referred to as a coding unit (CU). In this case, the coding unit may be recursively split from a coding tree unit according to a quad-tree binary-tree (QTBT) structure. For example, one coding tree unit may be split into a plurality of nodes of deeper depth based on a quad tree structure and/or a binary tree structure. In this case, for example, the quad tree structure may be applied first, and the binary tree structure may be applied later. Alternatively, the binary tree structure may be applied first. Decoding may be performed on a node that is not split any more, and a coding unit may be determined for a node that is not split any more as described above. Since the coding tree unit is a unit for splitting a coding unit, the coding tree unit may be referred to as a coding unit. In this case, the coding tree unit may be referred to as a largest coding unit (LCU) since the coding unit is determined by split of the coding tree unit.

As described above, a coding procedure according to the present invention may be performed based on a final coding unit that is not split any more. In this case, the coding tree unit itself may be used as a final coding unit based on coding efficiency or the like according to video characteristics, or a coding unit may be recursively split into coding units of a further deeper depth as needed, and a coding unit of an optimal size may be used as a final coding unit. Here, the coding procedure may include a procedure such as prediction, transform, reconstruction or the like described below.

As another example, a processing unit may include a coding unit (CU), a prediction unit (PU), or a transform unit (TU). The coding unit may be split from a coding tree unit into coding units of deeper depth according to a quad tree structure. In this case, the coding tree unit itself may be used as a final coding unit based on coding efficiency or the like according to video characteristics, or a coding unit may be recursively split into coding units of a further deeper depth as needed, and a coding unit of an optimal size may be used as a final coding unit. When a minimum coding unit (min CU) is set, a coding unit may not be split into coding units smaller than the minimum coding unit. Here, a final coding unit means a coding unit that functions as a basis for being partitioned or split into prediction units or transform units. The prediction unit is a unit partitioned from a coding unit and may be a unit of sample prediction. At this point, the prediction unit may be split into subblocks. The transform unit may be split from a coding unit according to a quad tree structure and may be a unit for inducing a transform coefficient and/or a unit for inducing a residual signal from the transform coefficient. Hereinafter, the coding unit may be referred to as a coding block (CB), the prediction unit may be referred to as a prediction block (PB), and the transform unit may be referred to as a transform block (TB). A prediction block or a prediction unit may mean a specific area of a block shape within a picture and may include an array of prediction samples. In addition, a transform block or transform unit may mean a specific area of a block shape within a picture and may include an array of transform coefficients or residual samples.

The prediction unit 110 may perform prediction on a processing target block (hereinafter, referred to as a current block) and generate a predicted block including prediction samples for the current block. The unit of prediction performed by the prediction unit 110 may be a coding block, a transform block, or a prediction block.

The prediction unit 110 may determine whether intra prediction or inter prediction is applied to the current block. For example, the prediction unit 110 may determine whether intra prediction or inter prediction is applied by the unit of CU.

In the case of intra prediction, the prediction unit 110 may derive a prediction sample for the current block based on a reference sample outside the current block in a picture to which the current block belongs (hereinafter, referred to as a current picture). At this point, the prediction unit 110 may (i) derive a prediction sample based on an average or interpolation of neighboring reference samples of the current block, and (ii) derive the prediction sample based on a reference sample existing in a specific (prediction) direction with respect to the prediction sample among the neighboring reference samples of the current block. The case of (i) may be referred to as a non-directional mode or a non-angular mode, and the case of (ii) may be referred to as a directional mode or an angular mode. In the intra prediction, a prediction mode may have, for example, 33 directional prediction modes and at least two non-directional modes. The non-directional mode may include a DC prediction mode and a planar mode. The prediction unit 110 may determine a prediction mode applied to the current block by using the prediction mode applied to neighboring blocks.

In the case of inter prediction, the prediction unit 110 may derive a prediction sample for the current block based on a sample specified by a motion vector on a reference picture. The prediction unit 110 may derive a prediction sample for the current block by applying any one among a skip mode, a merge mode, and a motion vector prediction (MVP) mode. In the case of the skip mode and the merge mode, the prediction unit 110 may use motion information of a neighboring block as motion information of the current block. In the case of the skip mode, unlike the merge mode, the difference (residual) between the prediction sample and the original sample is not transmitted. In the case of the MVP mode, a motion vector of the current block may be derived using a motion vector of a neighboring block as a motion vector predictor of the current block.

In the case of inter prediction, the neighboring block may include a spatial neighboring block existing in the current picture and a temporal neighboring block existing in a reference picture. The reference picture including the temporal neighboring block may be referred to as a collocated picture (colPic). The motion information may include a motion vector and a reference picture index. Information such as prediction mode information and motion information may be (entropy) encoded and output in the form of a bitstream.

When motion information of a temporal neighboring block is used in the skip mode and the merge mode, the highest picture on a reference picture list may be used as a reference picture. Reference pictures included in the reference picture list may be arranged based on a difference in the picture order count (POC) between the current picture and the reference picture. The POC corresponds to the display order of pictures and may be distinguished from the coding order.

The subtraction unit 121 generates a residual sample, which is a difference between an original sample and the prediction sample. When the skip mode is applied, the residual sample may not be generated as described above.

The transform unit 122 generates a transform coefficient by transforming the residual sample by the unit of transform block. The transform unit 122 may perform transform according to the size of a corresponding transform block and a prediction mode applied to a coding block or a prediction block spatially overlapped with the transform block. For example, when intra prediction is applied to the coding block or the prediction block overlapped with the transform block, and the transform block is a 4×4 residual array, the residual sample is transformed using a Discrete Sine Transform (DST) transform kernel, and in other cases, the residual sample may be transformed using a Discrete Cosine Transform (DST) transform kernel.

The quantization unit 123 may generate quantized transform coefficients by quantizing transform coefficients.

The rearrangement unit 124 rearranges the quantized transform coefficients. The rearrangement unit 124 may rearrange the quantized transform coefficients of a block shape in the form of a one-dimensional vector through a coefficient scanning method. Here, although the rearrangement unit 124 is described as a separate configuration, the rearrangement unit 124 may be a part of the quantization unit 123.

The entropy encoding unit 130 may perform entropy encoding on the quantized transform coefficients. The entropy encoding may include, for example, encoding methods such as exponential Golomb, context-adaptive variable length coding (CAVLC), context-adaptive binary arithmetic coding (CABAC), and the like. The entropy encoding unit 130 may encode information needed for video reconstruction (e.g., a value of a syntax element, etc.) together or separately, in addition to the quantized transform coefficients. The entropy-encoded information may be transmitted or stored in the form of a bitstream by the unit of network abstraction layer (NAL).

The inverse quantization unit 125 performs inverse-quantization on the values quantized by the quantization unit 123 (quantized transform coefficients), and the inverse transform unit 126 generates a residual sample by performing inverse-transform on the values inverse-quantized by the inverse quantization unit 125.

The addition unit 140 reconstructs a picture by adding the residual sample and the prediction sample. The residual sample and the prediction sample may be added by the unit of block to generate a reconstructed block. Here, although the addition unit 140 is described as a separate configuration, the addition unit 140 may be a part of the prediction unit 110. Meanwhile, the addition unit 140 may be referred to as a reconstruction unit or a reconstructed block generation unit.

For a reconstructed picture, the filter unit 150 may apply a deblocking filter and/or a sample adaptive offset. Through the deblocking filter and/or the sample adaptive offset, an artifact of a block boundary in the reconstructed picture or distortion in the quantization process may be corrected. The sample adaptive offset may be applied by the unit of sample and may be applied after the process of deblocking filtering is completed. The filter unit 150 may apply an adaptive loop filter (ALF) to the reconstructed picture. The ALF may be applied to a reconstructed picture after applying the deblocking filter and/or the sample adaptive offset.

The memory 160 may store the reconstructed picture (the decoded picture) or information needed for encoding/decoding. Here, the reconstructed picture may be a reconstructed picture for which a filtering procedure has been completed by the filter unit 150. The stored reconstructed picture may be used as a reference picture for (inter) prediction of other pictures. For example, the memory 160 may store (reference) pictures used for inter prediction. At this point, the pictures used for inter prediction may be specified by a reference picture set or a reference picture list.

Figure 2:
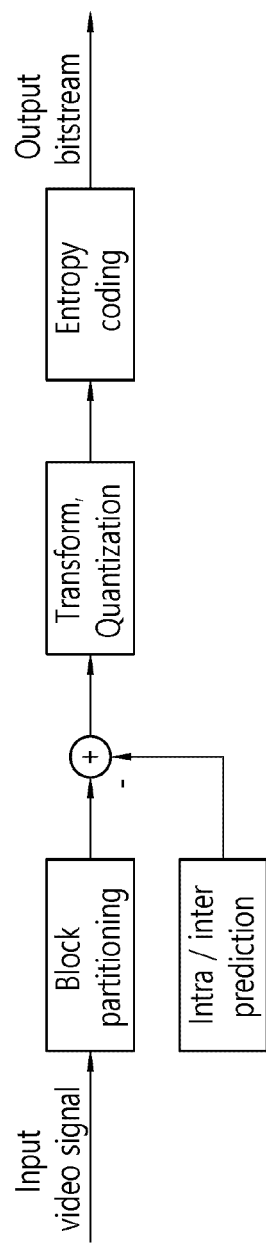
FIG. 2 is a view showing an example of a video encoding method performed by a video encoding device.

FIG. 2 is a view showing an example of a video encoding method performed by a video encoding device. Referring to FIG. 2, the video encoding method may include processes of block partitioning, intra/inter prediction, transform, quantization, and entropy encoding. For example, a current picture may be split into a plurality of blocks, and a prediction block of the current block may be generated through intra/inter prediction, and a residual block of the current block may be generated through subtraction of the input block of the current block and the prediction block. Thereafter, a coefficient block, i.e., transform coefficients of the current block, may be generated through transform of the residual block. The transform coefficients may be quantized, entropy encoded, and stored in a bitstream.

Figure 3:
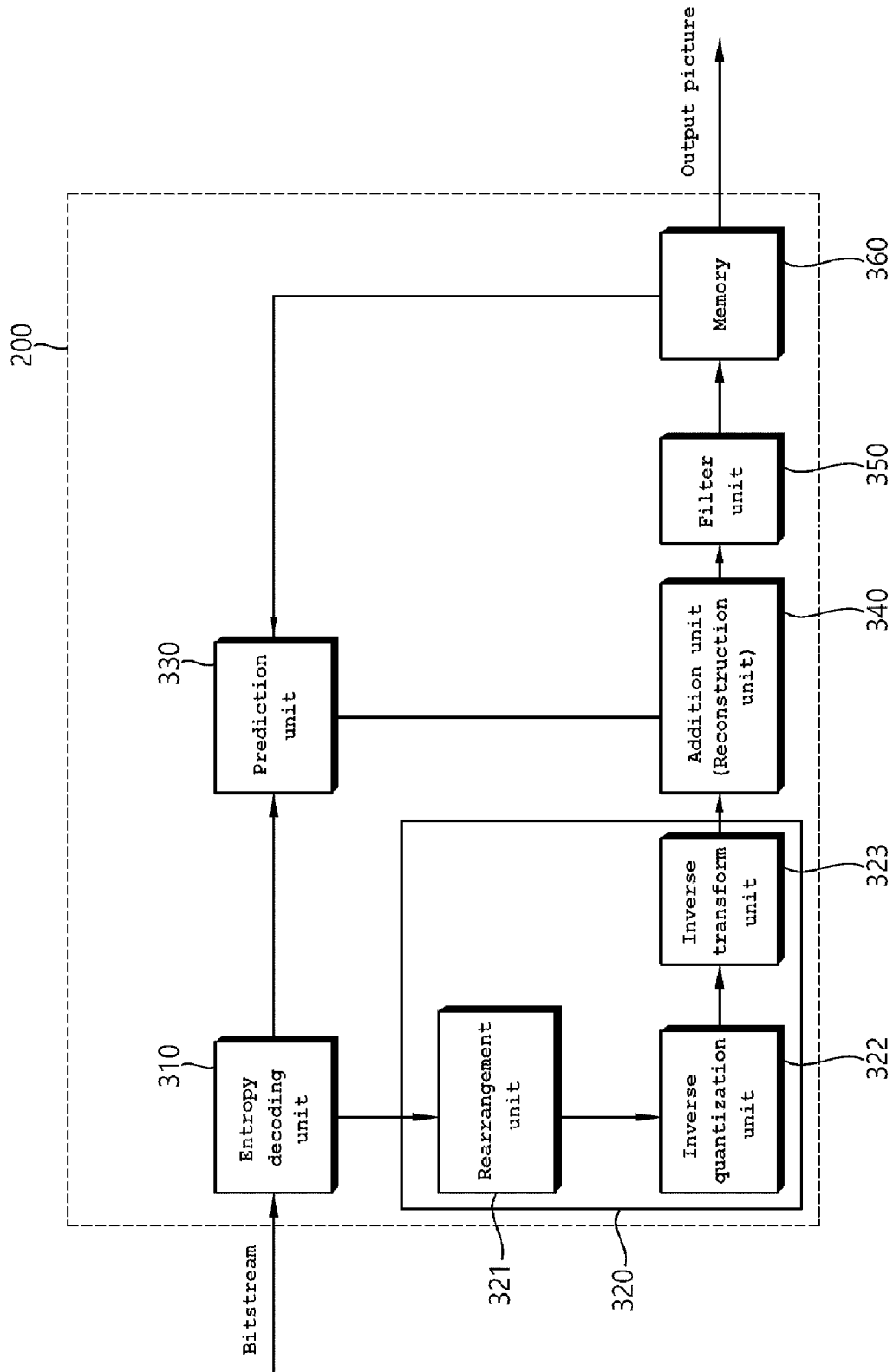
FIG. 3 is a view schematically showing the configuration of a video decoding device to which the present invention may be applied.

FIG. 3 is a view schematically showing the configuration of a video decoding device to which the present invention may be applied.

Referring to FIG. 3, a video decoding device 300 may include an entropy decoding unit 310, a residual processing unit 320, a prediction unit 330, an addition unit 340, a filter unit 350, and a memory 360. Here, the residual processing unit 320 may include a rearrangement unit 321, an inverse quantization unit 322, and an inverse transform unit 323.

When a bitstream including video information is input, the video decoding device 300 may reconstruct a video in response to a process in which video information is processed by the video encoding device.

For example, the video decoding device 300 may perform video decoding using a processing unit applied in the video encoding device. Accordingly, the processing unit block of video decoding may be, for example, a coding unit, and as another example, it may be a coding unit, a prediction unit, or a transform unit. The coding unit may be split from a coding tree unit according to a quad tree structure and/or a binary tree structure.

A prediction unit and a transform unit may be further used in some cases, and in this case, the prediction block is a block derived or partitioned from a coding unit and may be a unit of sample prediction. At this point, the prediction unit may be split into subblocks. The transform unit may be split from a coding unit according to a quad tree structure and may be a unit for inducing a transform coefficient or a unit for inducing a residual signal from the transform coefficient.

The entropy decoding unit 310 may parse a bitstream and output information needed for video reconstruction or picture reconstruction. For example, the entropy decoding unit 310 may decode information in a bitstream based on a coding method such as exponential Golomb coding, CAVLC, or CABAC, and output a value of a syntax element needed for video reconstruction, and quantized values of transform coefficients related to the residual.

More specifically, the CABAC entropy decoding method may receive a bin corresponding to each syntax element from a bitstream, determine a context model using syntax element information of a decoding target and decoding information of neighboring and decoding target blocks or using information on the symbol/bin decoded in a previous step, and generate a symbol corresponding to a value of each syntax element by performing arithmetic decoding on the bin after predicting a probability of occurrence of the bin according to the determined context model. At this point, the CABAC entropy decoding method may update the context model by using information on the decoded symbol/bin for the sake of the context model of a next symbol/bin after the context model is determined.

Among the information decoded by the entropy decoding unit 310, information on prediction is provided to the prediction unit 330, and the residual value on which entropy decoding is performed by the entropy decoding unit 310, i.e., the quantized transform coefficient, may be input into the rearrangement unit 321.

The rearrangement unit 321 may rearrange the quantized transform coefficients in the form of a two-dimensional block. The rearrangement unit 321 may perform rearrangement in response to coefficient scanning performed by the encoding device. Here, although the rearrangement unit 321 is described as a separate configuration, the rearrangement unit 321 may be a part of the inverse quantization unit 322.

The inverse quantization unit 322 may inverse quantize the quantized transform coefficients based on (inverse) quantization parameters and output transform coefficients. At this point, information for deriving the quantization parameters may be signaled from the encoding device.

The inverse transform unit 323 may derive residual samples by performing inverse transform on the transform coefficients.

The prediction unit 330 may perform prediction on the current block and generate a predicted block including prediction samples for the current block. The unit of prediction performed by the prediction unit 330 may be a coding block, a transform block, or a prediction block.

The prediction unit 330 may determine whether to apply intra prediction or inter prediction based on the information on the prediction. At this point, the unit for determining which of the intra prediction and the inter prediction to apply may be different from the unit for generating a prediction sample. In addition, in inter prediction and intra prediction, the units for generating a prediction sample may also be different. For example, whether to apply inter prediction or intra prediction may be determined by the unit of CU. In addition, for example, in inter prediction, a prediction mode may be determined, and a prediction sample may be generated by the unit of PU. In intra prediction, a prediction mode may be determined by the unit of PU, and a prediction sample may be generated by the unit of TU.

In the case of intra prediction, the prediction unit 330 may derive a prediction sample for the current block based on neighboring reference samples in the current picture. The prediction unit 330 may derive the prediction sample for the current block by applying a directional mode or a non-directional mode based on the neighboring reference samples of the current block. At this point, a prediction mode to be applied to the current block may be determined by using the intra prediction mode of a neighboring block.

In the case of inter prediction, the prediction unit 330 may derive a prediction sample for the current block based on a sample specified on a reference picture by a motion vector on the reference picture. The prediction unit 330 may derive the prediction sample for the current block by applying any one among a skip mode, a merge mode, and an MVP mode. At this point, motion information needed for inter prediction of the current block provided by the video encoding device, such as information on the motion vector, the reference picture index and the like, may be obtained or derived based on information on the prediction.

In the case of the skip mode and the merge mode, motion information of a neighboring block may be used as motion information of the current block. At this point, the neighboring block may include a spatial neighboring block and a temporal neighboring block.

The prediction unit 330 may construct a merge candidate list by using motion information of available neighboring blocks and may use information indicated by a merge index in the merge candidate list as a motion vector of the current block. The merge index may be signaled from the encoding device. The motion information may include a motion vector and a reference picture. When motion information of a temporal neighboring block is used in the skip mode and the merge mode, the highest picture in the reference picture list may be used as the reference picture.

In the case of the skip mode, the difference (residual) between the prediction sample and the original sample is not transmitted unlike the merge mode.

In the case of the MVP mode, a motion vector of the current block may be derived by using a motion vector of a neighboring block as a motion vector predictor. At this point, the neighboring block may include a spatial neighboring block and a temporal neighboring block.

For example, when the merge mode is applied, the merge candidate list may be generated by using a motion vector of a reconstructed spatial neighboring block and/or a motion vector corresponding to a Col block, which is a temporal neighboring block. In the merge mode, the motion vector of a candidate block selected from the merge candidate list is used as the motion vector of the current block. The information on the prediction may include a merge index indicating a candidate block having an optimal motion vector selected among candidate blocks included in the merge candidate list. At this point, the prediction unit 330 may derive a motion vector of the current block by using the merge index.

As another example, when the Motion Vector Prediction (MVP) mode is applied, a motion vector predictor candidate list may be generated by using a motion vector of a reconstructed spatial neighboring block and/or a motion vector corresponding to a Col block, which is a temporal neighboring block. That is, the motion vector of a reconstructed spatial neighboring block and/or the motion vector corresponding to a Col block, which is a temporal neighboring block, may be used as a motion vector candidate. The information on the prediction may include a prediction motion vector index indicating an optimal motion vector selected among the motion vector candidates included in the list. At this point, the prediction unit 330 may select a prediction motion vector of the current block among the motion vector candidates included in the motion vector candidate list by using the motion vector index. The prediction unit of the encoding device may obtain a motion vector difference (MVD) between the motion vector of the current block and the motion vector predictor and encode and output the motion vector difference in the form of a bitstream. That is, the MVD may be obtained by subtracting the motion vector predictor from the motion vector of the current block. At this point, the prediction unit 330 may obtain the motion vector difference included in the information on the prediction and derive the motion vector of the current block through addition of the motion vector difference and the motion vector predictor. The prediction unit may also obtain or derive a reference picture index or the like indicating the reference picture from the information on the prediction.

The addition unit 340 may reconstruct the current block or the current picture by adding the residual sample and the prediction sample. The addition unit 340 may reconstruct the current picture by adding the residual sample and the prediction sample by the unit of block. When the skip mode is applied, as the residual is not transmitted, the prediction sample may become a reconstructed sample. Here, although the addition unit 340 is described as a separate configuration, the addition unit 340 may be a part of the prediction unit 330. Meanwhile, the addition unit 340 may be referred to as a reconstruction unit or a reconstructed block generation unit.

The filter unit 350 may apply a deblocking filtering sample adaptive offset and/or an ALF to the reconstructed picture. At this point, the sample adaptive offset may be applied by the unit of sample and may be applied after deblocking filtering. The ALF may be applied after deblocking filtering and/or sample adaptive offset.

The memory 360 may store the reconstructed picture (decoded picture) or information needed for decoding. Here, the reconstructed picture may be a reconstructed picture for which a filtering procedure has been completed by the filter unit 350. For example, the memory 360 may store pictures used for inter prediction. At this point, the pictures used for inter prediction may be specified by a reference picture set or a reference picture list. The reconstructed picture may be used as a reference picture for another picture. In addition, the memory 360 may output reconstructed pictures in an output order.

Figure 4:
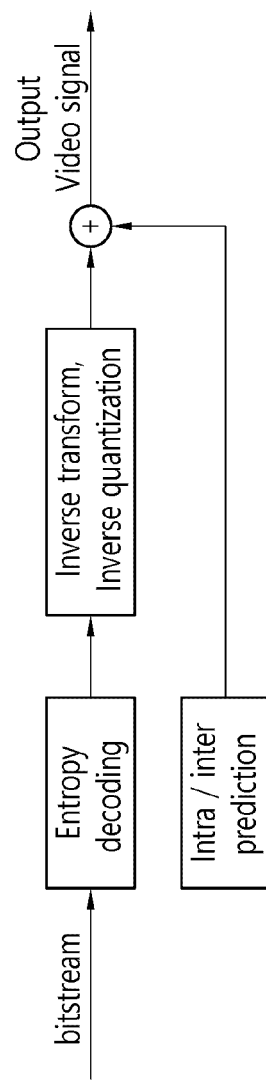
FIG. 4 is a view showing an example of a video decoding method performed by a decoding device.

FIG. 4 is a view showing an example of a video decoding method performed by a video decoding device. Referring to FIG. 4, the video decoding method may include the processes of entropy decoding, inverse quantization, inverse transform, and intra/inter prediction. For example, an inverse process of the encoding method may be performed in the decoding device. Specifically, quantized transform coefficients may be obtained through entropy decoding of a bitstream, and a coefficient block of the current block, i.e., transform coefficients, may be obtained through an inverse quantization process on the quantized transform coefficients. A residual block of the current block may be derived through inverse transform of the transform coefficients, and a reconstructed block of the current block may be derived through addition of the prediction block of the current block derived through intra/inter prediction and the residual block.

Meanwhile, operators in the embodiments described below may be defined as shown in the following table.

TABLE 1

| | |
|---|---|
| Floor(x) | the largest integer less than or equal to x. |
| Log2(u) | the base-2 logarithm of u. |
| Ceil(x) | the smallest integer greater than or equal to x. |
| x >> y | Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation. |
| x << y | Arithmetic left shift of a two's complement integer representation of x by y binary digits. This function is defined only for non-negative integer values of y. Bits shifted into the least significant bits (LSBs) as a result of the left shift have a value equal to 0. |
| > | greater than. |
| >= | greater than or equal to. |
| < | less than. |
| <= | less than or equal to. |
| == | equal to. |
| != | not equal to. |

Referring to Table 1, Floor(x) may represent a maximum integer value smaller than or equal to x, Log 2 (u) may represent a logarithmic value with 2 of u as the base, and Ceil(x) may represent a minimum integer value larger than or equal to x. For example, in the case of Floor(5.93), since the maximum integer value smaller than or equal to 5.93 is 5, it may represent 5.

In addition, referring to Table 1, x>>y may represent an operator that shifts x to the right y times, and x<<y may represent an operator that shifts x to the left y times.

<Introduction>

The HEVC standard proposes two types of screen split methods.

1) Slice: It provides a function of encoding/decoding a picture by splitting the picture in coding tree units (CTU) in a raster scan order. And, there is slice header information.

2) Tile: It provides a function of encoding/decoding a picture by partitioning the picture into multiple columns and rows by the unit of CTU. The partitioning method may include both equal partitioning and individual partitioning. A header for the tile does not separately exist.

Figure 5:
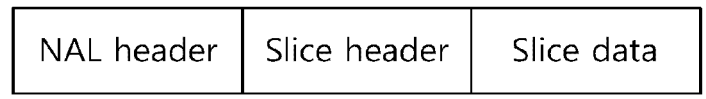
FIG. 5 is a view showing an example of a NAL packet for a slice.

The slice becomes a bitstream packing unit. That is, one slice may be generated from one network abstraction layer (NAL) bitstream. As shown in FIG. 5, a NAL packet for a slice is configured in order of NAL header, slice header, and slice data. At this point, a NAL unit type (NUT) is included in NAL header information.

NUTs for a slice proposed in the HEVC standard according to an embodiment are as shown in Table 2. In Table 2, NUTs for inter slice in which inter prediction is performed are 0 to 9, and NUTs for intra slice in which intra prediction is performed are 16 to 21. Here, the inter slice means that it is encoded in an inter prediction method, and the intra slice means that it is encoded in an intra prediction method. One slice is defined to have one NUT, and a plurality of slices in a picture may all be set to have the same NUT value. For example, when one picture is split into 4 slices and encoded in the intra prediction method, the NUT values for all the 4 slices in the picture may be equally set to "19: IDR_W_RADL".

TABLE 2

| nal_unit_type | Name of nal_unit_type | Content of NAL unit and RBSP syntax structure |
|---|---|---|
| 0, 1 | TRAIL_N, TRAIL_R | Coded slice of a non-TSA, non-STSA trailing picture |
| 2, 3 | TSA_N, TSA_R | Coded slice of a TSA picture |
| 4, 5 | STSA_N, STSA_R | Coded slice of an STSA picture |
| 6, 7 | RADL_N, RADL_R | Coded slice of an RADL picture |
| 8, 9 | RASL_N, RASL_R | Coded slice of an RASL picture |
| 16, 17, 18 | BLA_W_LP, BLA_W_RADL, BLA_N_LP | Coded slice of a BLA picture |
| 19, 20 | IDR_W_RADL, IDR_N_LP | Coded slice of an IDR picture |
| 21 | CRA | Coded slice of a CRA picture |

In Table 2, the abbreviations may be defined as shown below.
TSA (Temporal sub-layer Switching Access)
STSA (Step-wise Temporal sub-layer Switching Access)
RADL (Random Access Decodable Leading)
RASL (Random Access Skipped Leading)
BLA (Broken Link Access)
IDR (Instantaneous Decoding Refresh)
CRA (Clean Random Access)
LP (Leading Picture)
_N (No reference)
_R (Reference)
_W_LP/RADL (With LP/RADL)
_N_LP (No LP, without LP)

BLA, IDR, and CRA, which are NUTs for intra slice, are referred to as Intra Random Access Point (IRAP). IRAP means a picture capable of random access to a position in the middle of a bitstream. That is, it refers to a picture in which the playback position may be suddenly changed during video playback. The intra slice may exist only in an I slice type.

Figure 6:
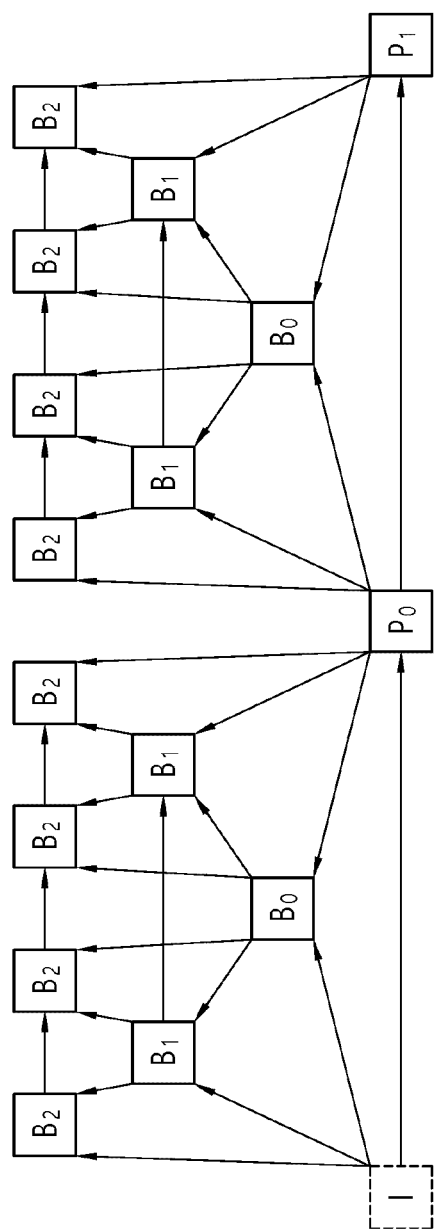
FIG. 6 is a view showing an example of a hierarchical GOP structure.

The inter slice may be classified as a P slice or a B slice according to unidirectional prediction (P: predictive) or bidirectional prediction (B: bi-predictive). The prediction and encoding process is performed by the unit of group of pictures (GOP), and the HEVC standard performs an encoding/decoding process including prediction by using a hierarchical GOP structure. FIG. 6 shows an example of the hierarchical GOP structure, and each picture is classified as I, P, or B picture (slice) according to a prediction method.

Figure 7:
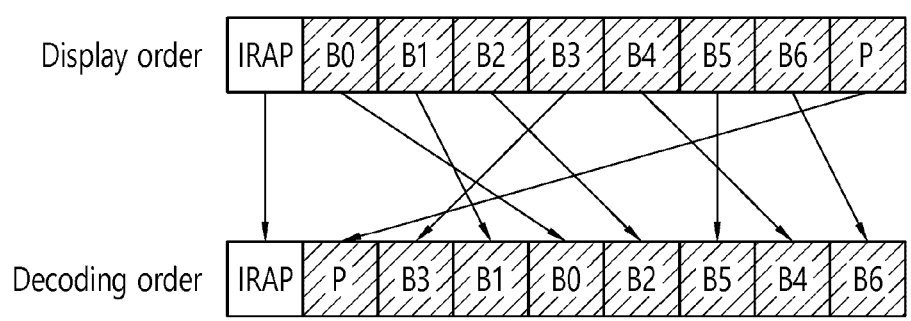
FIG. 7 is a view showing an example of a display output order and a decoding order.

Due to the characteristics of the B slice performing bidirectional prediction and/or the hierarchical GOP structure, a decoding order and a display order of pictures in a sequence are different (see FIG. 7). In FIG. 7, IRAP means intra slice, B and P mean inter slice, and it may be confirmed that the playback order and the reconstruction order have been changed completely.

Figure 8:
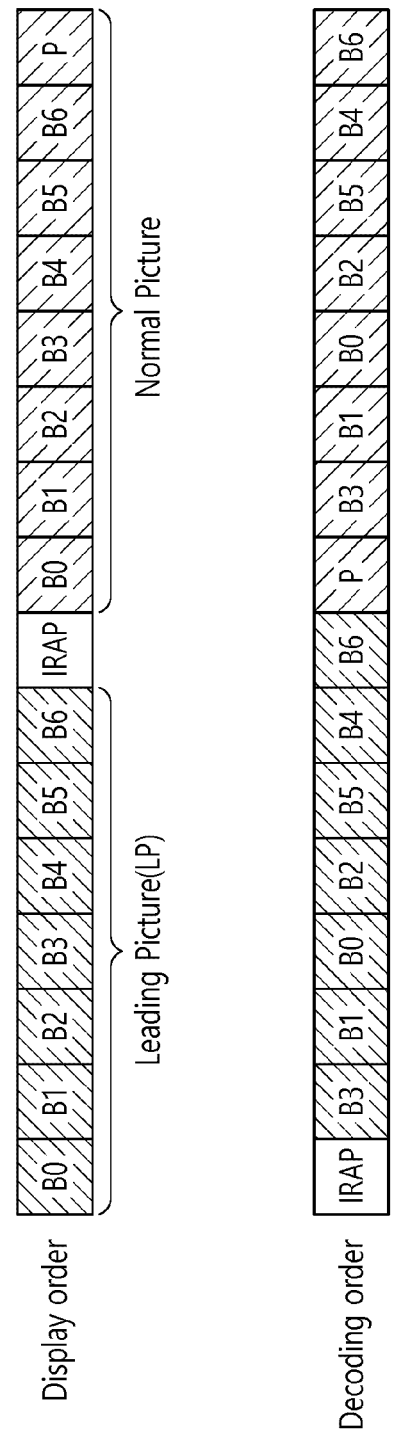
FIG. 8 is a view showing an example of a leading picture and a normal picture.

Among the inter slices, a picture that precedes the IRAP in the playback order while following the IRAP in the reconstruction order is referred to as a leading picture (LP) (see FIG. 8). The LP is classified as RADL or RASL depending on situation. When random access occurs, an LP that can be decoded is defined as RADL, and an LP that cannot be decoded during random access and thus the reconstruction process of a corresponding picture should be skipped is defined as RASL. In FIG. 8, pictures of the same color are defined as one GOP.

Figure 9:
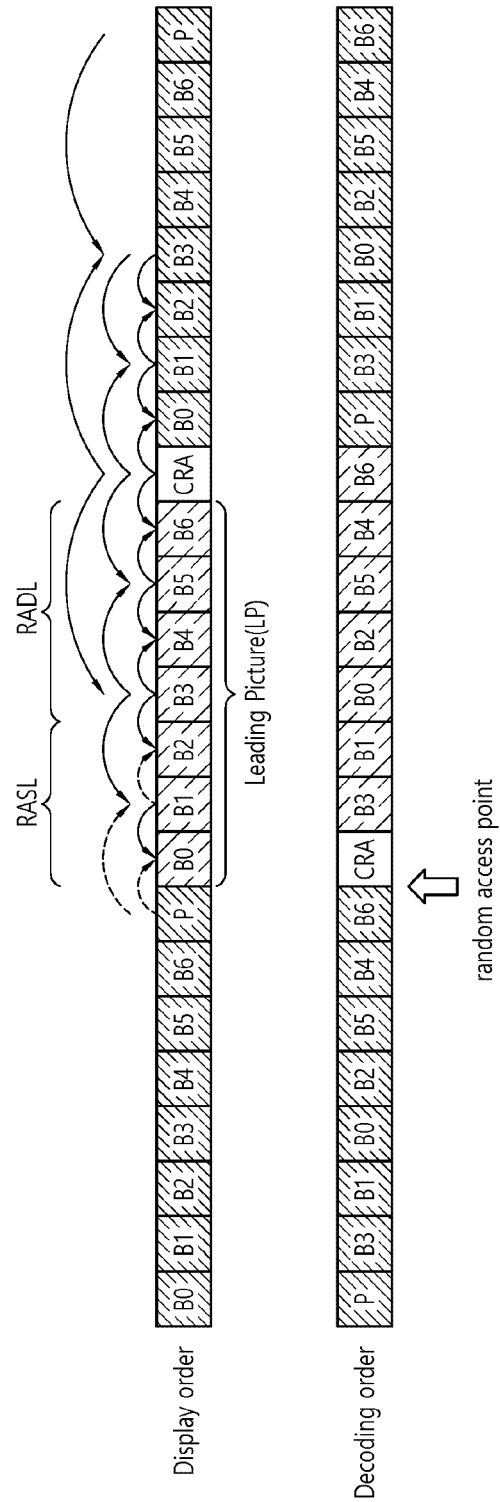
FIG. 9 is a view showing an example of a RASL picture and a RADL picture.

Distinction between the RADL and the RASL is determined according to the position of a reference picture during inter screen prediction (see FIG. 9). That is, the RASL means an inter picture which uses a reconstructed picture in a GOP other than a corresponding GOP as a reference picture, or uses a picture reconstructed using a reconstructed picture in another GOP as a reference picture as a reference picture. In this case, it is referred to as open GOP since the reconstructed picture in another GOP is (directly or indirectly) used as a reference picture. RASL and RADL are set as NUT information for a corresponding inter slice.

A NUT for an intra slice is classified as another intra slice NUT according to the NUT of an inter slice that precedes and/or follows in the playback order and/or the reconstruction order of the corresponding intra slice. Seeing the IDR NUT, IDR may be classified as IDR_W_RADL with RADL and IDR_N_LP without an LP. That is, IDR is a type that does not have an LP or a type having only RADL among the LPs, and IDR may not have RASL. On the other hand, CPA is a type that may have both RADL and/or RASL among the LPs. That is, CRA is a type that may support open GOP.

Generally, since the intra slice performs only intra screen prediction, reference picture information for the intra slice is not required. Here, a reference picture is used for inter screen prediction. However, due to the characteristic of the CRA NUT slice supporting an open GOP structure, reference picture information is inserted in the NAL bitstream of a corresponding CRA although a CRA slice is an intra slice. The reference picture information is information on a reference picture to be used in an inter slice after a corresponding CRA (in the order of reconstruction), not for being used in a corresponding CPA slice. This is not to remove the reference picture from the decoded picture buffer (DPB). For example, when the NUT of a corresponding intra slice is IDR, the DPB is reset. That is, all reconstructed pictures existing in the DPB at the time point are removed. FIG. 10 is a view showing syntax for a slice segment header. As shown in FIG. 10, when the NUT of a corresponding slice is not IDR, reference picture information may be described in the bitstream. That is, when the NUT of a corresponding slice is CRA, reference picture information may be described.

The present invention proposes a subpicture split method for synthesis with other sequences and a slice split method for bitstream packing.

In the present invention, a slice means an encoding/decoding area and is a data packing unit for generating one NAL bitstream. For example, a sheet of picture is split into a plurality of slices, and each slice is generated as one NAL packet through an encoding process.

Figure 11:
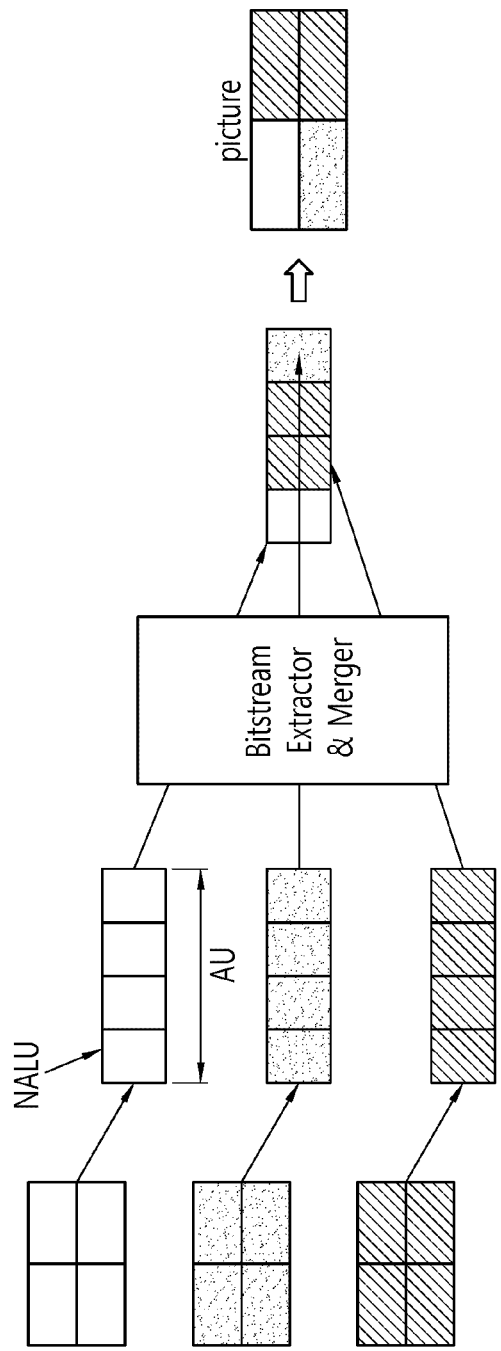
FIG. 11 is a view showing an example of a contents synthesizing process.

In the present invention, a subpicture is a division of area for synthesis with other contents. FIG. 11 shows an example of synthesis with other contents. There are three contents of white, gray and black, and an AU (access unit) of each content is divided into four slices to generate a packet, and like the image on the right side in FIG. 11, a new image may be generated by synthesizing the upper left portion with white contents, the lower left portion with gray contents, and the right portion with black contents. Here, in the white area and the gray area, one slice may be configured as one subpicture, and in the black area, two slices may be configured as one subpicture. That is, one subpicture may include at least one slice. To generate a new image (to synthesize contents), a Bit-stream Extractor and Merger (BEAMer) extracts areas from different contents by the unit of subpicture and synthesizes them. In FIG. 11, the synthesized image may be split into four slices and configured of three subpictures.

Figure 12:
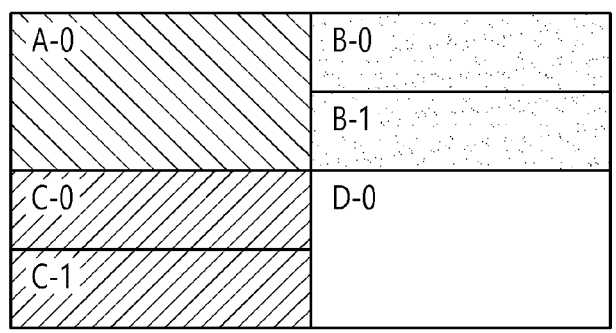
FIG. 12 is a view showing an example of a subpicture ID and a slice address.

One subpicture means an area having the same subpicture ID and/or the same subpicture index value. In other words, at least one slice having the same subpicture ID and/or the same subpicture index value may be referred to as one subpicture area. Here, the subpicture ID and/or the subpicture index value is included in the slice header information. The subpicture index value may be set in a raster scan order. FIG. 12 shows an example in which one picture is configured of 6 (rectangular) slices and 4 subpicture areas (of different colors). Here, "A", "B", "C" and "D" denote examples of subpicture ID, and "0" and "1" denote slice addresses within a corresponding subpicture. That is, a slice address value is a slice index value in the raster scan order within a corresponding subpicture. For example, "B-0" means a 0-th slice in the B subpicture, and "B-1" means a first slice in the B subpicture.

In the present invention, NUT values for two or more subpictures constituting one image may be different. For example, in FIG. 12, the white subpicture (slice) in one sheet of image may be an intra slice, and the gray subpicture (slice) and the black subpicture (slice) may be inter slices.

This has an advantage of easily constituting/synthesizing a video since it does not need to equally set the NUTs of a plurality of subpictures constituting a picture when synthesizing different contents. A corresponding function may be referred to as a mixed NAL unit type in a single picture and may be simply named as a mixed NUT. mixed_nalu_type_in_pic_flag may be used to set enabled/disabled of the corresponding function. A corresponding flag may be defined at a position of one or more among sequence parameter set (SPS), picture parameter set (PPS), picture header (PH), and slice header (SH). For example, when the flag is defined in the PPS, the flag may be named as pps_mixed_nalu_types_in_pic_flag.

When the flag value is disabled (e.g., mixed_nalu_type_in_pic_flag==0), NUTs for all subpictures and/or slices in the corresponding picture may have the same value. For example, NUTs for all video coding layer (VCL) NAL units for a picture may be set to have the same value. In addition, a picture or a picture unit (PU) may be referenced to have a NUT the same as that of a slice NAL unit encoded for the picture or picture unit. Here, VCL means a NAL type for a slice including a slice data value.

On the other hand, when the flag value is enabled (e.g., mixed_nalu_type_in_pic_flag==1), the corresponding picture may be configured of two or more subpictures. In addition, NUTs for the subpictures and/or slices in the corresponding picture may have the different value. In addition, when the flag value is enabled, it may be restricted so that the VCL NAL unit of the picture may not have a NUT of GDR_NUT type. In addition, when the NUT (e.g., the first NUT) of any one VCL NAL unit (e.g., the first NAL unit) of a corresponding picture is any one among IDR_W_RADL, IDR_N_LP, and CRA_NUT, it may be restricted so that the NUT (e.g., the second NUT) of another VCL NAL unit (e.g., the second NAL unit) of the picture may be set to any one among IDR_W_RADL, IDR_N_LP, CRA_NUT, and TRAIL_NUT. For example, it may be restricted so that the second NUT may be set to one value among the first NUT and the TRAIL_NUT.

Figure 13:
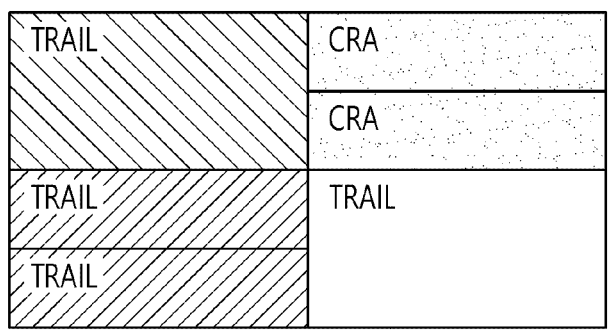
FIG. 13 is a view showing an example of a NUT for each subpicture/slice.

An example in which VCL NAL units of the corresponding picture have at least two different NUT values will be described with reference to FIGS. 12 and 13. In an embodiment, two or more subpictures may have two or more different NUT values. At this point, it may be restricted so that the NUT values for all slices included in one subpicture are the same. For example, as shown in FIG. 13, NUT values for the two slices in subpicture B of FIG. 12 may be equally set to CRA, and NUT values for the two slices in subpicture C may be equally set to TRAIL, and subpictures A, B, C, and D may be set to have at least two or more different NUT values. Accordingly, as shown in FIG. 13, the NUT value for the slices in subpictures A, C and D is TRAIL, and it may be set to have a NUT value different from CRA, which is the NUT of subpicture B.

In the present invention, the NUTs for intra slice and inter slice may be specified as shown in Table 3. As shown in the embodiment of Table 3, definitions and functions for RADL, RASL, IDR, CRA and the like may be set in the same manner as shown in the HEVC standard (Table 1). In the case of Table 3, a mixed NUT type is added. In Table 3, the value 'disabled' (e.g., 0) of mixed_nalu_type_in_pic_flag may represent a NUT for a slice in a picture (in the same manner as HEVC), and the value 'enabled' (e.g., 1) of mixed_nalu_type_in_pic_flag may represent a NUT for a slice in a subpicture. For example, when the value of mixed_nalu_type_in_pic_flag is 0 and the NUT of the VCL NAL unit is TRAIL_NUT, the NUT of the current picture may be identified as TRAIL_NUT, and the NUT of another subpicture belonging to the current picture may also be derived as TRAIL_NUT. In addition, when the value of mixed_nalu_type_in_pic_flag is 1 and the NUT of the VCL NAL unit is TRAIL_NUT, the NUT of the current subpicture may be identified as TRAIL_NUT, and the NUT of at least one among other subpictures belonging to the current picture may be predicted as not being TRAIL_NUT.

TABLE 3

| Name of nal_unit_type | Content of NAL unit and RBSP syntax structure | NAL unit type class |
|---|---|---|
| TRAIL_NUT | Coded slice of a trailing picture or subpicture* slice_layer_rbsp( ) | VCL |
| STSA_NUT | Coded slice of an STSA picture or subpicture* slice_layer_rbsp( ) | VCL |
| RADL_NUT | Coded slice of a RADL picture or subpicture* slice_layer_rbsp( ) | VCL |
| RASL_NUT | Coded slice of a RASL picture or subpicture* slice_layer_rbsp( ) | VCL |
| IDR_W_RADL IDR_N_LP | Coded slice of an IDR picture or subpicture* slice_layer_rbsp( ) | VCL |
| CRA_NUT | Coded slice of a CRA picture or subpicture* slice_layer_rbsp( ) | VCL |
| GDR_NUT | Coded slice of a GDR picture or subpicture* slice_layer_rbsp( ) | VCL |

* 는 mixed_nal_unit_types_in_pic 의 값이 0인 경우내치의속성을나타내고, mixed_nal_unit_types_in_pic 의 값이 1인 경우서브픽처의속성을나타냄

*represents the attribute of a picture when the value of mixed_nal_unit_types_in_pic is 0 and represents the attribute of a subpicture when the value of mixed_nal_unit_types_in_pic is 1.

As described above, in the case where the value of mixed_nalu_type_in_pic_flag indicates enabled (e.g., 1), when any one VCL NAL unit (e.g., the first NAL unit) belonging to one picture has any one value among IDR_W_RADL, IDR_N_LP, and CRA_NUT as a NUT (e.g., the first NUT), at least one VCL NAL unit (e.g., the second NAL unit) among other VCL NAL units of the picture may have any one NUT value, other than the first NUT, among IDR_W_RADL, IDR_N_LP, CRA_NUT, and TRAIL_NUT as a NUT (e.g., the second NUT).

In this manner, when a VCL NAL unit (e.g., the first NAL unit) for the first subpicture belonging to one picture has any one value among IDR_W_RADL, IDR_N_LP, and CRA_NUT as a NUT (e.g., a first NUT), the VCL NAL unit (e.g., a second NAL unit) for the second subpicture of the corresponding picture may have any one NUT value, other than the first NUT, among IDR_W_RADL, IDR_N_LP, CRA_NUT, and TRAIL_NUT as a NUT (e.g., a second NUT).

For example, when the value of mixed_nalu_type_in_pic_ flag indicates activation (e.g., 1), the NUT value of the VCL NAL unit for two or more subpictures may be configured as shown below. The following description is for illustrative purposes only and is not limited thereto.

Combination 1) IRAP+non-IRAP (inter)
Combination 2) non_IRAP (inter)+non-IRAP (inter)
Combination 3) IRAP+IRAP=IDR+CRA (limited by embodiment)

Combination 1) is an embodiment in which at least a subpicture in a picture has an IRAP (IDR or CRA) NUT value, and at least one other subpicture has a non-IRAP (inter slice) NUT value. Here, a value excluding the LPs (RASL and RADL) may be allowed as an inter slice NUT value. For example, an LP (RASL or RADL) may not be allowed as the inter slice NUT value. In this manner, it may be restricted so that the RASL and RADL subpictures are not encoded in a bitstream associated with the IDR or CRA subpicture.

In another embodiment, only a TRAIL value may be allowed as the inter slice NUT value. Alternatively, in another embodiment, all inter slice VCL NUTs may be allowed as the inter slice NUT value.

Combination 2) is an embodiment in which at least a subpicture in a picture has a non-IRAP (inter slice) NUT value, and at least one other subpicture has a different non-IRAP (inter slice) NUT value. For example, at least a subpicture may have a RASL NUT value while at least one other subpicture has a RADL NUT value. In the case of an embodiment according to combination 2, restrictions described below may be applied according to embodiments.

In one embodiment, LPs (RASL and RADL) and a non-LP (TRAIL) may not be used together. For example, the NUT of at least one other subpicture may not be TRAIL while the NUT of at least a subpicture is RASL (or RADL). When the NUT of at least a subpicture is RASL (or RADL), RASL or RADL may be used as the NUT of at least one other subpicture. For example, the leading subpicture of an IRAP subpicture may be forced to be a RADL or RASL subpicture.

In another embodiment, LPs (RASL and RADL) and a non-LP (TRAIL) may be used together. For example, while at least a subpicture is RASL (or RADL), at least one other subpicture may be TRAIL.

In another embodiment, exceptionally in the case of condition 2), all subpictures may have the same inter slice NUT value. For example, all subpictures in a picture may have a TRAIL NUT value. As another example, all subpictures in a picture may have a RASL (or RADL) NUT value.

Combination 3) shows an embodiment in which all subpictures or slices in a picture are configured of IRAP. For example, when the NUT value for a slice in a first subpicture is IDR_W_RADL, IDR_N_LP, or CRA_NUT, the NUT value for a slice in a second subpicture may be configured of a value among IDR_W_RADL, IDR_N_LP, and CRA_NUT, which is not the NUT of the first subpicture. For example, while a NUT value for a slice in at least a subpicture is IDR, a NUT value for a slice in at least one other subpicture may be configured as CPA.

Meanwhile, according to embodiments, application of an embodiment such as Combination 3 may be limited. In an embodiment, all pictures belonging to an IRAP or GDR access unit may be restricted to have the same NUT. That is, when the current access unit is an IRAP access unit configured of only IRAP pictures, or the current access unit is a GDR access unit configured of only GDR pictures, it may be restricted so that all pictures belonging thereto may have the same NUT. For example, it may be restricted so that while the NUT value for a slice in at least a subpicture is IDR, the NUT value for a slice in at least one other subpicture is not configured as CRA. In this manner, when combination 3) is restricted and the combination 1) and combination 2) described above are applied, it may be restricted so that at least a subpicture in the corresponding picture may have a NUT value for a non-IRAP (inter slice). For example, in the encoding and decoding process, it may be restricted so that all subpictures in a corresponding picture may not have a NUT value for IDR. Alternatively, it may be restricted so that some subpictures in a corresponding picture have a NUT value for IDR, and other subpictures may not have a CRA_NUT value.

Hereinafter, syntax and semantics related to signaling of encoded information when a mixed NAL unit type (NUT) is applied in a picture will be described. In addition, a decoding process using the syntax and semantics will be described. As described above, when mixed_nalu_type_in_pic_flag=1, a picture described by a NUT may mean a subpicture (see Table 3).

Meanwhile, as described above, when the value of mixed_nalu_type_in_pic_flag indicates that a mixed NUT is applied, a picture may be split into at least two subpictures. Accordingly, information on the subpictures for the picture may be signaled through a bitstream. In this sense, mixed_nalu_type_in_pic_flag may indicate whether the current picture is split. For example, when the value of mixed_nalu_type_in_pic_flag indicates that a mixed NUT is applied, it may indicate that the current picture is split.

Hereinafter, it will be described with reference to the syntax shown in FIG. 14. FIG. 14 is a view showing an embodiment of syntax of a picture parameter set (PPS). For example, a flag (e.g., pps_no_pic_partition_flag) indicating whether the current picture is split through a bitstream may be signaled through the picture parameter set (PPS). A value indicating enabled of pps_no_pic_partition_flag (e.g., 1) may indicate that split of picture is not applied to pictures currently referencing the PPS. A value indicating disabled of pps_no_pic_partition_flag (e.g., 0) may indicate that split of picture using slices or tiles may be applied to the pictures currently referencing the PPS. In this embodiment, when the value of mixed_nalu_type_in_pic_flag indicates that a mixed NUT is applied, the value of pps_no_pic_partition_flag may be forced to a value indicating disabled (e.g., 0).

When pps_no_pic_partition_flag indicates that the current picture may be split, information on the number of subpictures (e.g., pps_num_subpics_minus1) may be obtained from the bitstream. pps_num_subpics_minus1 may indicate a value obtained by subtracting 1 from the number of subpictures included in the current picture. When pps_no_pic_partition_flag indicates that the current picture is not split, the value of pps_num_subpics_minus1 may not be obtained from the bitstream and may be derived as 0. According to the information on the number of subpictures determined like this, encoded information for each subpicture may be signaled as much as the number of subpictures included in a picture. For example, a subpicture identifier (e.g., pps_subpic_id) for identifying each subpicture and/or the value of a flag (subpic_treated_as_pic_flag[i]) indicating whether the encoding/decoding process of each subpicture is independent may be determined and signaled.

The mixed NUT may be applied when a picture is configured of two or more subpictures. At this point, the value of a flag (subpic_treated_as_pic_flag[i]) indicating whether the encoding/decoding process of each subpicture is independent may be determined and signaled as many as the number of subpictures (i) included in a picture. That a subpicture is independently decoded indicates that decoding is performed by treating the subpicture as a separate picture. That is, when the value of the flag is "on" (e.g., subpic_treated_as_pic_flag=1), the corresponding subpicture may be decoded to be independent from the other subpictures in all the other decoding processes except an in-loop filter process. Contrarily, when the value of the flag is "off" (e.g., subpic_treated_as_pic_flag=0), the corresponding subpicture may refer to the other subpictures in the picture in the inter prediction process. Here, a separate flag may be set for the in-loop filter process to control whether a subpicture is independent from or refers to other subpictures. The corresponding flag (subpic_treated_as_pic_flag) may be defined at a position of one or more among SPS, PPS, and PH. For example, when the flag is defined in the SPS, the flag may be named as sps_subpic_treated_as_pic_flag.

In addition, in the present invention, when there are different NUTs in a picture (e.g., mixed_nalu_type_in_pic_flag=1), each subpicture in the picture should be independently encoded/decoded due to the characteristic that heterogeneous NUTs should be used for the subpictures in a picture. For example, in the case of a picture in which mixed_nalu_type_in_pic_flag=1, when one or more inter (P or B) slices are included in the picture, the subpic_treated_as_pic_flag value of all subpictures in the picture may be forced to be set to "1" or to be driven to a value of "1". Alternatively, when mixed_nalu_type_in_pic_flag=1, subpic_treated_as_pic_flag may be forced not to have a value of "0". For example, in the case of a picture in which mixed_nalu_type_in_pic_flag=1, when one or more inter slices are included in the picture, the value of subpic_treated_as_pic_flag may be reset to "1" for all subpictures of the picture regardless of a parsed value. Contrarily, in the case of a picture in which mixed_nalu_type_in_pic_flag=1 and subpic_treated_as_pic_flag=0 for all subpictures in the picture, an inter slice should not be included in the picture. That is, in the case of a picture in which mixed_nalu_type_in_pic_flag=1 and subpic_treated_as_pic_flag=0, the slice type in the picture should be intra.

In addition, in another embodiment, in the case where mixed_nalu_type_in_pic_flag=1, when the NUT of the current picture is RASL, subpic_treated_as_pic_flag for the current picture may be forced to be set to "1". As another example, in the case where mixed_nalu_type_in_pic_flag=1, when the NUT of the current picture is RADL and the NUT of a referenced picture is RASL, subpic_treated_as_pic_flag for the current picture may be forced to "1".

The mixed NUT function may restrict all subpictures (or slices) in a picture from being configured of IRAP. At this point, the value of a flag (gdr_or_irap_pic_flag) indicating that all slices in a picture are configured of IRAP or that a corresponding picture is a GDR (Gradual Decoding Refresh) picture may be forced to "0". That is, in the present invention, when there is another NUT in a picture (mixed_nalu_type_in_pic_flag=1), the value of the flag (gdr_or_irap_pic_flag) may be set to "0" or may be derived as a value of "0". Alternatively, when mixed_nalu_type_in_pic_flag=1, gdr_or_irap_pic_flag may be forced not to have a value of "1". The flag (gdr_or_irap_pic_flag) may be defined at a position of one or more among SPS, PPS, and PH.

In addition, as the mixed NUT function is applied, at least a subpicture in a picture may have an IRAP (IDR or CRA) NUT value, and at least one other subpicture may have a non-IRAP (inter slice) NUT value. That is, intra slices and inter slices may exist in a picture at the same time. In the case of the existing HEVC standard, when the NUT of a corresponding intra slice is IDR, the DPB is reset. Accordingly, all reconstructed pictures existing in the DPB at the time point are removed.

However, according to the present invention, when mixed_nalu_type_in_pic_flag=1, since intra slices and inter slices may exist in a picture at the same time, there is a case in which the DPB may not be reset although a picture is an IDR NUT. Accordingly, in an embodiment, when a corresponding slice is an IDR NUT, reference picture information (RPL: reference picture list) may be inserted in the NAL bitstream as slice header information of a corresponding IDR, like the CRA. To this end, although a corresponding slice is an IDR NUT, the value of a flag (idr_rpl_present_flag) indicating existence of RPL information may be set to "1". When the value of the flag (idr_rpl_present_flag) is "1", the RPL exists as slice header information of the IDR. Contrarily, when the value of the flag (idr_rpl_present_flag) is "0", the RPL does not exist as slice header information of the IDR.

Meanwhile, in the present invention, when another NUT exists in a picture (mixed_nalu_type_in_pic_flag=1) and the RPL information of an IDR picture is not allowed (idr_rpl_present_flag=0), the NUT for the picture may not have a value of IDR_W_RADL or IDR_N_LP.

The flag (idr_rpl_present_flag) may be defined at a position of one or more among SPS, PPS, and PH. For example, when the flag is defined in the SPS, the flag may be named as sps_idr_rpl_present_flag. For example, although the NUT of the current slice is IDR_W_RADL or IDR_N_RADL, slice header information may be signaled using the syntax of the slice header in FIG. 15 in order to signal the RPL according to the value of sps_idr_rpl_present_flag. Here, a first value (e.g., 0) of sps_idr_rpl_present_flag may indicate that the RPL syntax element may not be provided by the slice header of a slice of which the NUT is IDR_N_LP or IDR_W_RADL. A second value (e.g., 1) of sps_idr_rpl_present_flag may indicate that the RPL syntax element may be provided by the slice header of a slice of which the NUT is IDR_N_LP or IDR_W_RADL.

Meanwhile, in another embodiment, when mixed_nalu_type_in_pic_flag=1, the RPL may be signaled as picture header information. For example, in the application of the syntax shown in FIG. 14, when the value of mixed_nalu_type_in_pic_flag indicates that a mixed NUT is applied, the value of pps_no_pic_partition_flag may be forced to a value indicating disabled (e.g., 0). Accordingly, the value of a flag (pps_rpl_info_in_ph_flag) indicating whether the RPL information is provided from the picture header may be obtained from a bitstream. When pps_rpl_info_in_ph_flag indicates enabled (e.g., 1), the RPL information may be obtained from the picture header as shown in FIGS. 16 and 17. In this way, the RPL information may be obtained regardless of the type of a corresponding picture based on the value of mixed_nalu_type_in_pic_flag. On the other hand, when pps_rpl_info_in_ph_flag indicates disabled (e.g., 0), the RPL information may not be obtained from the picture header. For example, when the slice NUT is IDR_N_LP or IDR_W_RADL and the value of sps_idr_rpl_present_flag is "0" while the value of pps_rpl_info_in_ph_flag is "0", the RPL information of a corresponding slice may not be obtained. That is, since there is no RPL information of a corresponding slice, the RPL information may be induced as being initialized and empty.

As described above, a picture may be signaled as NAL units with different types. In this way, since a NAL unit having different NUTs may be used to signal a picture, a method for determining a type of a picture according to the type of the NAL unit is required. Accordingly, in the case of random access (RA), whether a corresponding picture can be normally reconstructed, and output may be determined.

In the decoding process according to an embodiment, when each VCL NAL unit corresponding to a picture is a NAL unit of a CRA_NUT type, the picture may be determined as a CRA picture. In addition, when each VCL NAL unit corresponding to a picture is a NAL unit of an IDR_W_RADL or IDR_N_LP type, the picture may be determined as an IDR picture. In addition, when each VCL NAL unit corresponding to a picture is a NAL unit of an IDR_W_RADL, IDR_N_LP, or CRA_NUT type, the picture may be determined as an IRAP picture.

In addition, when each VCL NAL unit corresponding to a picture is a NAL unit of a RADL_NUT type, the picture may be determined as a random access decodable leading (RADL) picture. In addition, when each VCL NAL unit corresponding to a picture is a NAL unit of a TRAIL_NUT type, the picture may be determined as a trailing picture. In addition, when the type of at least one VCL NAL unit among VCL NAL units corresponding to a picture is a RASL_NUT type and the types of all the other VCL NAL units are a RASL_NUT type or a RADL_NUT type, the picture may be determined as a random access skipped leading (RASL) picture.

Meanwhile, in the decoding process according to another embodiment, when at least a subpicture is RASL in a picture and at least one other subpicture is RADL, the picture may be determined as a RASL picture. For example, when at least a subpicture is RASL in a picture and at least one other subpicture is RADL, the picture may be set as a RASL picture in the decoding process. Here, when the type of a VCL NAL unit corresponding to a subpicture is RASL_NUT, the subpicture may be determined as RASL. Accordingly, in the case of RA, both the RASL subpicture and the RADL subpicture may be treated as a RASL picture, and accordingly, the picture may not be output.

Meanwhile, in the decoding process according to another embodiment, when at least a subpicture in a picture is RASL, the picture may be set as a RASL picture. For example, when at least a subpicture in a picture is RASL and at least one other subpicture is TRAIL, the picture may be set as a RASL picture in the decoding process. Accordingly, in the case of RA, the picture may be treated as a RASL picture, and the picture may not be output.

Here, occurrence of RA may be determined by the value of NoOutputBeforeRecoveryFlag of an IRAP picture connected (related) to a corresponding inter slice (RADL, RASL, or TRAIL). When the flag value is "1" (NoOutputBeforeRecoveryFlag=1), it means occurrence of RA, and when the flag value is "0" (NoOutputBeforeRecoveryFlag=0), it means a normal playback. The flag value may be set as follows for IRAP.

The process of setting the value of NoOutputBeforeRecoveryFlag when the current picture is IRAP
① When the picture is the first picture in a bitstream, NoOutputBeforeRecoveryFlag is set to "1".
② When the picture is IDR, NoOutputBeforeRecoveryFlag is set to "1".

③ When the picture is CRA and RA is notified from the outside, NoOutputBeforeRecoveryFlag is set to "1".

④ When the picture is CRA and RA is not notified from the outside, NoOutputBeforeRecoveryFlag is set to "0".

In an embodiment, the decoding device may receive a signal indicating occurrence of random access from an external terminal. For example, the external terminal may signal occurrence of random access to the decoding device by setting the value of random access occurrence information to 1 and signaling the random access occurrence information to the decoding device. The decoding device may set the value of flag HandleCraAsClvsStartFlag indicating whether occurrence of random access is received from the external terminal to 1 according to the random access occurrence information received from the external terminal. The decoding device may set the value of NoOutputBeforeRecoveryFlag to a value the same as the value of HandleCraAsClvsStartFlag. Accordingly, when the current picture is a CRA picture and the value of HandleCraAsClvsStartFlag is "1", the decoding device may determine that random access has occurred for a corresponding CPA picture, or may perform decoding by treating the CRA as being located at the beginning of a bitstream.

In the case of RA, the process of setting a flag (PictureOutputFlag) that determines whether to output the current picture is as follows. For example, PictureOutputFlag for the current picture may be set in the order described below. Here, a first value (e.g., 0) of PictureOutputFlag may indicate that the current picture is not output. A second value (e.g., 1) of PictureOutputFlag may indicate that the current picture is output.

(1) When the current picture is RASL and NoOutputBeforeRecoveryFlag of a related IRAP picture is "1", PictureOutputFlag is set to "0".

(2) When the current picture is a GDR picture, of which the value of NoOutputBeforeRecoveryFlag is "1", or is a reconstructed picture thereof, PictureOutputFlag is set to "0"

(3) Otherwise, the value of PictureOutputFlag is set to a value the same as the value of pic_output_flag in a bitstream. Here, pic_output_flag may be obtained at a position of one or more among PH and SH.

Figure 18:
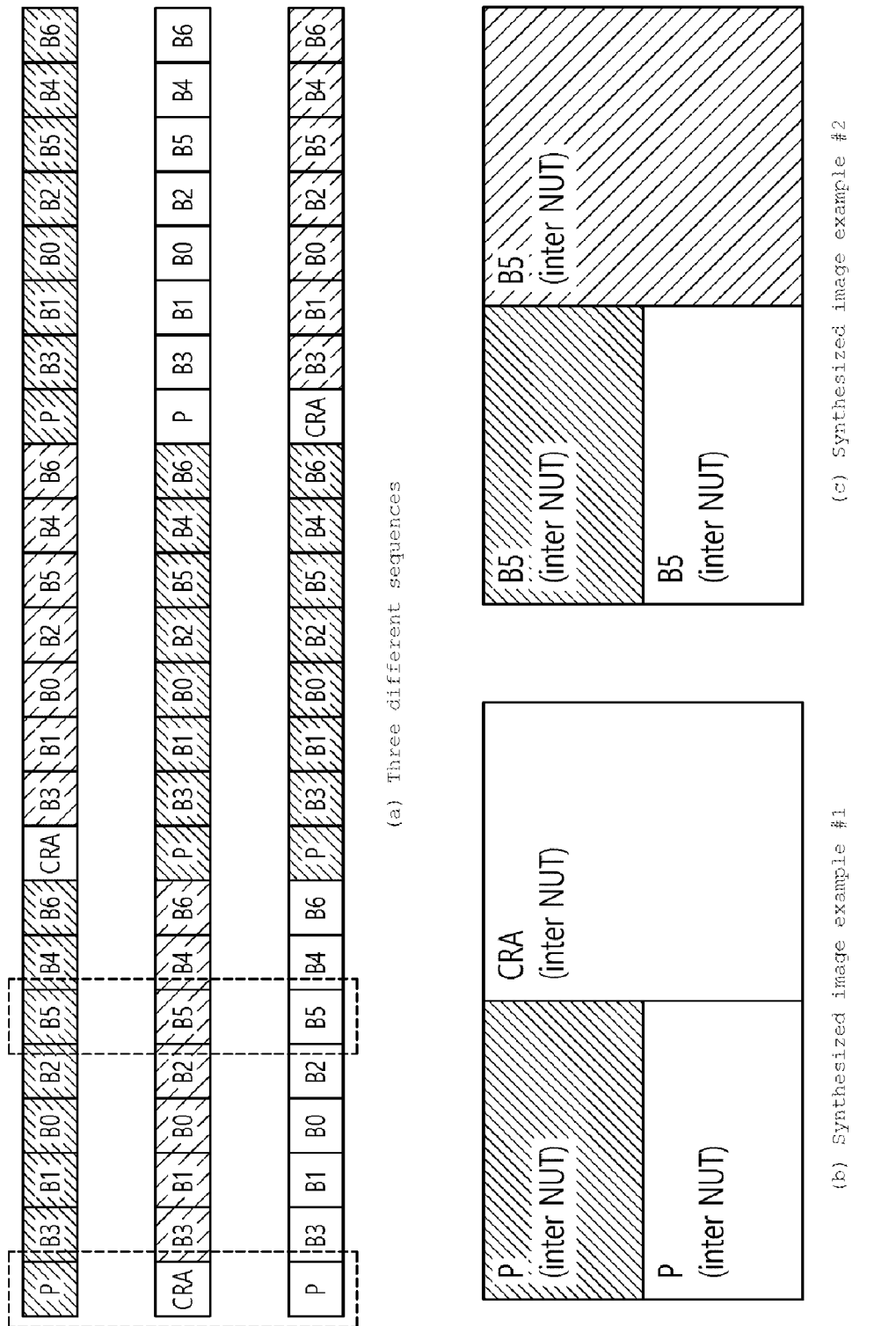
FIG. 18 is a view showing an example of synthesizing contents.

FIG. 18 shows an example of synthesis of three different contents presented in the present invention. FIG. 18(a) shows sequences for three different contents, and although one picture is shown as one packet for convenience, a picture may be split into a plurality of slices, and there may be a plurality of packets. FIGS. 18(b) and 18(c) show synthesized image results for the picture indicated by the dotted lines in FIG. 18 (a). In FIG. 18, the same color means the same picture/subpicture/slice. In addition, the P slice and the B slice may have a value among inter NUTs.

As described above, in the case of synthesizing a plurality of contents through the present invention, the contents may be quickly and easily synthesized without a delay by simply setting hierarchical GOP structures without the need of necessarily setting the positions of intra slices (pictures).

Embodiments of Encoding and Decoding

Figure 19:
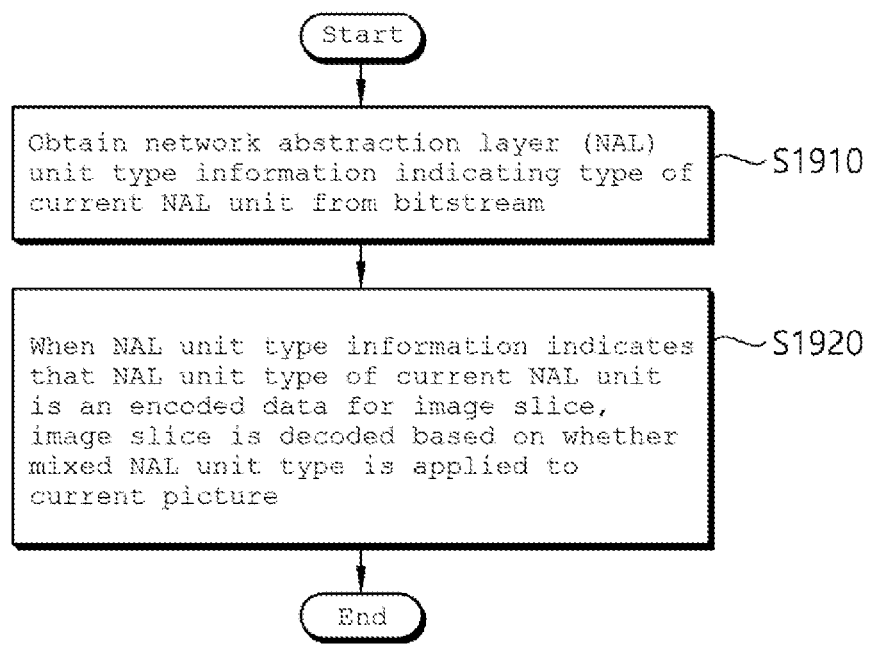
FIGS. 19 and 20 are flowcharts illustrating a decoding method and an encoding method according to an embodiment of the present invention.
Figure 20:
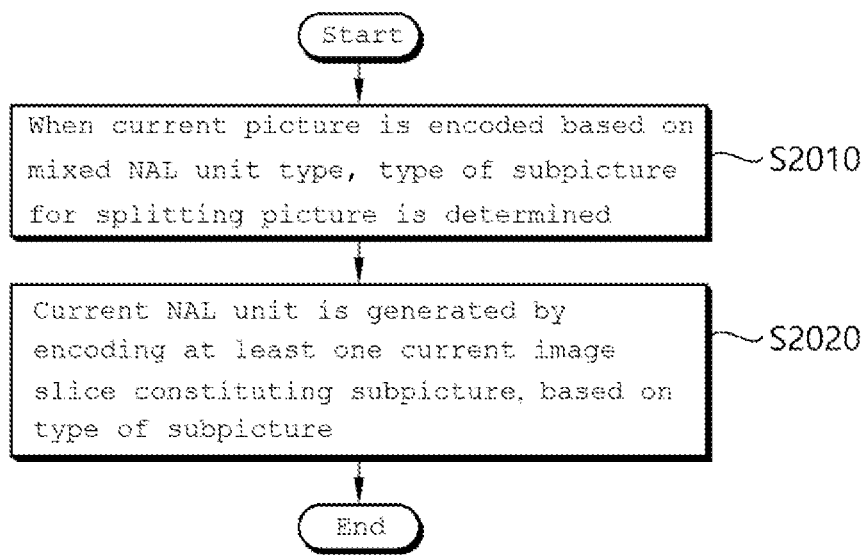

Hereinafter, a method of decoding a video by a video decoding device according to the method described above will be described. FIGS. 19 and 20 are flowcharts illustrating a decoding method and an encoding method according to an embodiment of the present invention.

A video decoding device according to an embodiment may include a memory and at least one processor and may perform the decoding method described below by the operation of the processor. First, the decoding device may obtain NAL unit type information indicating the type of a current network abstraction layer (NAL) unit from a bitstream (S1910).

Next, when the NAL unit type information indicates that the NAL unit type of a current NAL unit is an encoded data for a slice, the decoding device may decode the slice based on whether a mixed NAL unit type is applied to the current picture (S1920).

Here, the decoding device may perform decoding of the slice by determining whether the NAL unit type of the current NAL unit indicates the attribute of a subpicture for the current video slice based on whether the mixed NAL unit type is applied.

Whether the mixed NAL unit type is applied may be identified based on a first flag (e.g., pps_mixed_nalu_types_in_pic_flag) obtained from a picture parameter set. When the mixed NAL unit type is applied, the current picture to which the current slice belongs may be split into at least two subpictures.

Furthermore, based on whether the mixed NAL unit type is applied, decoding information for a subpicture may be included in a bitstream. In an embodiment, a second flag (e.g., pps_no_pic_partition_flag) indicating whether the current picture is not split may be obtained from the bitstream. In addition, when the second flag indicates that the current picture may be split (e.g., pps_no_pic_partition_flag==0), a third flag (e.g., pps_rpl_info_in_ph_flag) indicating whether reference picture list information is provided in the picture header may be obtained from the bitstream.

In this example, when the mixed NAL unit type is applied, the value of the second flag (pps_no_pic_partition_flag) is forced to 0 as the current picture is forced to be split into at least two subpictures, and the third flag (e.g., pps_rpl_info_in_ph_flag) indicating whether the reference picture list information is provided from the picture header may be obtained from a bitstream regardless of the value of the second flag (pps_no_pic_partition_flag) actually obtained from the bitstream. Accordingly, when the third flag indicates that the reference picture list information is provided from the picture header (e.g., pps_rpl_info_in_ph_flag==1), the reference picture list information may be obtained from a bitstream related to the picture header.

In addition, when the mixed NAL unit type is applied, the current picture may be decoded based on a first subpicture and a second subpicture having different NAL unit types. Here, when the NAL unit type of the first subpicture has any one value among Instantaneous Decoding Refresh_With_Random Access Decodable Leading (IDR_W_RADL), Instantaneous Decoding Refresh_No reference_Leading Picture (IDR_N_LP), and Clean Random Access NAL Unit Type (CRA_NUT), an available NAL unit type that can be selected as the second subpicture NUT may include a NAL unit type that is not selected by the first subpicture among IDR_W_RADL, IDR_N_LP, and CRA_NUT.

Alternatively, when the NAL unit type of the first subpicture has any one value among Instantaneous Decoding Refresh_With_Random Access Decodable Leading (IDR_W_RADL), Instantaneous Decoding Refresh_No reference_Leading Picture (IDR_N_LP), and Clean Random Access NAL Unit Type (CRA_NUT), the available NAL unit type of the second subpicture may include TRAIL_NUT (Trail_NAL Unit Type).

Meanwhile, when the mixed NAL unit type is applied, the first subpicture and the second subpicture constituting the current picture may be independently decoded. For example, the first subpicture and the second subpicture including a B or P slice may be treated and decoded as one picture. For example, the first subpicture may be decoded without using the second subpicture as a reference picture.

More specifically, a fourth flag (e.g., sps_subpic_treated_as_pic_flag) indicating whether the first subpicture is treated as a picture in the decoding process may be obtained from a bitstream. When the fourth flag indicates that the first subpicture is treated as a picture in the decoding process (e.g., sps_subpic_treated_as_pic_flag==1), the first subpicture may be treated and decoded as a picture in the decoding process. In this process, when the mixed NAL unit type is applied to the current picture and the current picture including the first subpicture includes at least one among the P slice and the B slice, the fourth flag may be forced to have a value indicating that the first subpicture is treated as a picture in the decoding process. On the other hand, when the mixed NAL unit type is applied to the current picture and the fourth flag indicates that the first subpicture is not treated as a picture in the decoding process (e.g., sps_subpic_treated_as_pic_flag==0), the slice type belonging to the current picture should be intra.

When the fourth flag indicates that the first subpicture is treated as a picture in the decoding process, it may be determined that the decoding process of the first subpicture is independent from those of the other subpictures. For example, when the fourth flag indicates that the first subpicture is decoded to be independent from the other subpictures in the decoding process, the first subpicture may be decoded without using other subpictures as a reference picture.

In addition, when the first subpicture is a Random Access Skipped Leading (RASL) subpicture, the current picture may be determined as a RASL picture based on whether the second subpicture is a Random Access Decodable Leading (RADL) subpicture. Here, when the type of a NAL unit corresponding to the first subpicture is a Random Access Skipped Leading_NAL Unit Type (RASL_NUT), the first subpicture may be determined as a RASL subpicture.

In addition, when the third flag (e.g., pps_rpl_info_in_ph_flag) indicates that the reference picture list information may be obtained from the slice header (e.g., pps_rpl_info_in_ph_flag==0) rather than the picture header, and the NAL unit type of the first subpicture has any one value among Instantaneous Decoding Refresh_With_Random Access Decodable Leading (IDR_W_RADL) and Instantaneous Decoding Refresh_No reference_Leading Picture (IDR_N_LP), the reference picture list information may be obtained from a bitstream related to the slice header, based on a fifth flag (e.g., sps_idr_rpl_present_flag) indicating whether or not the reference picture list information for an IDR picture may exist in the slice header. Here, the fifth flag may be obtained from a bitstream related to a sequence parameter set.

Meanwhile, in the case where random access is performed for an Intra Random Access Point (IRAP) picture related to the current picture, when the current picture is a Random Access Skipped Leading (RASL) subpicture, the current picture may not be output (displayed).

A video encoding device according to an embodiment may include a memory and at least one processor and may perform an encoding method corresponding to the above-described decoding method by the operation of the processor. For example, when a current picture is encoded based on a mixed NAL unit type, the encoding device may determine a type of subpicture for splitting the picture (S2010). In addition, the encoding device may generate a current NAL unit by encoding at least one current slice constituting the subpicture based on the type of the subpicture (S2020). At this point, when the current picture is encoded based on the mixed NAL unit type, the encoding device may encode a slice by encoding so that the NAL unit type of the current NAL unit indicates the attribute of the subpicture for the current slice.

In addition, the present invention may be implemented on a computer-readable recording medium as a code that can be read by a computer (including all devices having an information processing function). The computer-readable recording medium includes all types of recording devices for storing data that can be read by a computer system. Examples of the computer-readable recording devices include ROM, RAM, CD-ROM, magnetic tapes, floppy disks, and optical data storage devices.

Although the present invention has been described with reference to the embodiments shown in the drawings, these are merely exemplary, and those skilled in the art will appreciate that various modifications and equivalent other embodiments are possible therefrom. Therefore, the true scope of the present invention should be determined by the spirit of the attached claims.

What is claimed is:

1. A video decoding method performed by a video decoding device, the method comprising:
   receiving a bitstream;
   obtaining, from the bitstream, a first flag indicating whether a current picture includes subpictures having different network abstraction layer (NAL) unit types; and
   obtaining, from the bitstream, second flags, each of the second flags is associated with a respective one of the subpictures, wherein
   each of the second flags indicates whether an associated subpicture is treated as a picture in a decoding process,
   when the first flag indicates that the current picture includes subpictures having different NAL unit types, second flags for all subpictures having a NAL unit type equal to RASL (Random Access Skipped Leading) among the subpictures are restricted to have a first value regardless of whether each subpicture whose NAL unit type is equal to RASL is referenced, and
   the first value indicates that the associated subpicture is treated as a picture in a decoding process.

2. The method according to claim 1, wherein, in a decoding process excluding in-loop filtering, a subpicture whose second flag is equal to the first value is treated as a picture and decoded to be independent from other subpictures.

3. The method according to claim 1, wherein, when a first NAL unit of the picture has the NAL unit type equal to IDR or CRA, a second NAL unit of the picture is restricted to have the NAL unit type excluding RASL and RADL.

4. The method according to claim 3, the second NAL unit has the NAL unit type equal to one of IDR and CRA, and the NAL unit type of the second NAL unit is different from the NAL unit type of the first NAL unit.

5. The method according to claim 3, the second NAL unit has the NAL unit type equal to TRAIL.

6. The method according to claim 1, wherein, when the picture includes a subpicture having a NAL unit type equal to RASL and another subpicture having a NAL unit type equal to RADL (Random Access Decodable Leading), the picture is treated as a RASL picture in a decoding process.

7. The method according to claim 6, wherein the RASL picture is not output.

* * * * *